(12) United States Patent
Linson et al.

(10) Patent No.: US 6,209,209 B1
(45) Date of Patent: *Apr. 3, 2001

(54) ROLLING RUN-OUT MEASUREMENT APPARATUS AND METHOD

(75) Inventors: Dennis Linson, St. Charles; Daniel B. January, St. Peters, both of MO (US)

(73) Assignee: Hunter Engineering Company, Bridgeton, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/882,994

(22) Filed: Jun. 26, 1997

(51) Int. Cl.$^7$ .................................................. G01B 11/275
(52) U.S. Cl. .............................. 33/203.12; 33/203; 33/288
(58) Field of Search ........................... 33/203.12, 203.13, 33/203.14, 203.18, 203, 286, 288

(56) References Cited

U.S. PATENT DOCUMENTS

| | | | |
|---|---|---|---|
| 1,487,759 | * | 3/1924 | Skinner ............................ 33/203.14 |
| 1,808,287 | * | 6/1931 | Casler et al. ...................... 33/203.14 |
| 1,927,488 | * | 9/1933 | Christensen et al. ............. 33/203.12 |
| 1,950,994 | * | 3/1934 | Musselman ....................... 33/203.14 |
| 3,231,983 | * | 2/1966 | Bender .............................. 33/203.12 |
| 3,303,511 | * | 2/1967 | Bjorn ................................ 33/203.14 |
| 4,445,278 | * | 5/1984 | Staudinger ........................ 33/203.14 |
| 5,029,395 | | 7/1991 | Brauer et al. . |
| 5,313,710 | * | 5/1994 | Wakamori et al. ............... 33/203.13 |
| 5,386,639 | * | 2/1995 | Colarelli ............................ 33/203.14 |
| 5,535,522 | | 7/1996 | Jackson . |

* cited by examiner

Primary Examiner—Andrew H. Hirshfeld
(74) Attorney, Agent, or Firm—Polster, Lieder, Woodruff & Lucchesi L.C.

(57) ABSTRACT

Wheel alignment errors are substantially eliminated by making a first set of wheel alignment measurements while a vehicle is disposed at a first position with substantially all lateral forces applied thereto being relieved while the vehicle remains supported by its wheels, and making a second set of wheel alignment measurements while the vehicle is disposed at a second position with substantially all lateral forces applied thereto being relieved while the vehicle remains supported by its wheels.

22 Claims, 10 Drawing Sheets

ROLLING DIRECTION

ROLLING DIRECTION

ROLLING RUN-OUT MEASUREMENT APPARATUS AND METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to the vehicle alignment equipment, and more particularly with the procedures for measuring the run-out in the wheels, and/or wheel adapters, sensors, or targets in the case of a vision alignment system.

It is well known in the art of wheel alignment that it is necessary that the suspension be in a relaxed state when measuring or adjusting the alignment of a vehicle. Anti friction turnplates and anti friction skid plates (slip plates) are typically used under the front and rear axles of the vehicle respectively to achieve a relaxed condition. These devices (turnplates and skid plates) allow the vehicle wheels to move both longitudinally and laterally to relax all forces on the wheels. Such devices perform their function well, but they could be improved for certain applications.

For example, in wheel alignment it is important to measure the run-out of a wheel and/or wheel adapter, or sensor, (or a target in the case of a vision alignment system such as that shown in U.S. Pat. No. 5,535,522 to Jackson). This run-out measurement is then used when calculating the alignment angles of a wheel. Various run-out measurement schemes and devices are known. See, for example, U.S. Pat. No. 5,029,395 to Brauer et al. and the patents cited therein.

For the sake of speed it is desirable to perform this run-out measurement while rolling the vehicle, thereby eliminating the need to jack up a vehicle. When doing so, however, there are factors which can influence the run-out measurement and thereby cause errors.

As a vehicle is rolling, there may be lateral forces acting on the tires of the vehicle due to toe, camber, and/or caster. In certain cases these forces can cause errors in run-out calculations much larger than the tolerance of the required adjustment. For example, if a vehicle has an excessive amount of positive front total toe, when rolling the vehicle forward the front tires try to converge, causing the tires to scrub across the surface on which the vehicle is being rolled. This scrubbing creates lateral forces on the tires. These lateral forces can be great enough to distort suspension bushings and components which in turn change the alignment angles of each wheel. Prior art alignment machines are unable to separate the changes due to run-out from those changes due to the lateral forces on the tires. It has therefore been discovered to be necessary to eliminate these forces when conducting a run-out measurement while rolling a vehicle.

Another source of error when rolling a vehicle on a solid surface is when the rolling direction of the vehicle is reversed. When the vehicle is rolled forward (or backward) the lateral forces on the tires created by the tires scrubbing increase the forces on the suspension components causing distortion. When the direction of the vehicle is reversed these forces are relieved, changing the alignment of the wheels. For example, one prior art system involves moving the vehicle forwardly to a first position at which a first run-out measurement is taken, reversing the vehicle to move it to a second position where a second run-out measurement is taken, and then moving the vehicle forwardly back to the original position where a third run-out measurement is taken. It has been discovered that the second measurement taken with such systems is significantly in error, and that the third measurement also exhibits significant hysteresis for the reasons set forth above.

Prior art alignment equipment is not believed to be capable of either detecting these errors or compensating for them.

BRIEF SUMMARY OF THE INVENTION

Among the various objects and features of the present invention may be noted the provision of an apparatus which eliminates lateral forces on the wheels of a vehicle when measuring run-out (whether of a wheel and/or wheel adapter, sensor, or a target in the case of a vision alignment system).

Another object is the provision of such apparatus which may be used either in conjunction with or separate from a traditional turnplate for the front axle.

A third object is the provision of such apparatus which may be incorporated into new and existing lift racks or disposed in or upon the shop floor.

A fourth object is the provision of such an apparatus which includes slip plates which are restricted to lateral movement when conducting the run-out measurement.

A fifth object is the provision of a procedure for rolling run-out measurement which eliminates any effects on the vehicle alignment angles due to forces acting on the suspension and hysteresis in the suspension.

Other objects and features will be in part apparent and in part pointed out hereinafter.

Briefly, apparatus of the present invention eliminates various errors often encountered in the determination of vehicle alignment. The apparatus includes a first station at which alignment measurements for wheels of a first axle of a vehicle are made and a second station, disposed longitudinally of the first station, at which measurements for wheels of a second axle of the vehicle are made. Structure is provided for substantially eliminating lateral forces acting on the wheels at at least one of the first and second stations during measurement, that structure being fixed against longitudinal movement so as to allow the wheels of the vehicle to roll with respect to the structure.

A method of the present invention involves eliminating errors in wheel alignment measurements. It includes the steps of making a first set of wheel alignment measurements while a vehicle is disposed at a first position with substantially all lateral forces applied thereto being relieved, and making a second set of wheel alignment measurements while the vehicle is disposed at a second position with substantially all lateral forces applied thereto being relieved.

BRIEF DESCRIPTION OF THE SEVERAL VIEWS OF THE DRAWINGS

Similar reference characters indicate similar parts throughout the several views of the drawings.

DETAILED DESCRIPTION THE INVENTION

Figure 1:
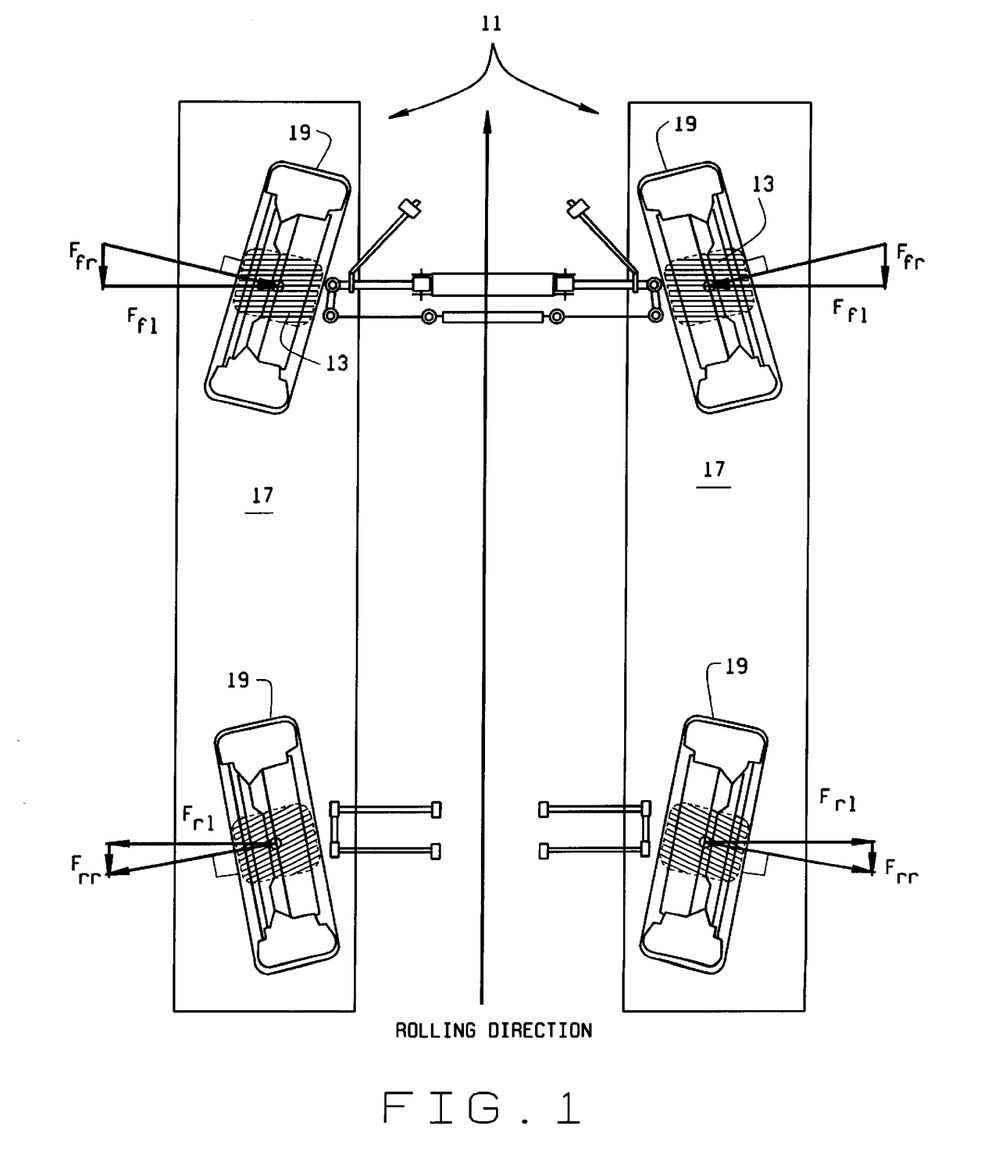
FIG. 1 is a simplified plan view illustrating the forces acting on the contact patch of the tires of a vehicle to be aligned.
Figure 7:
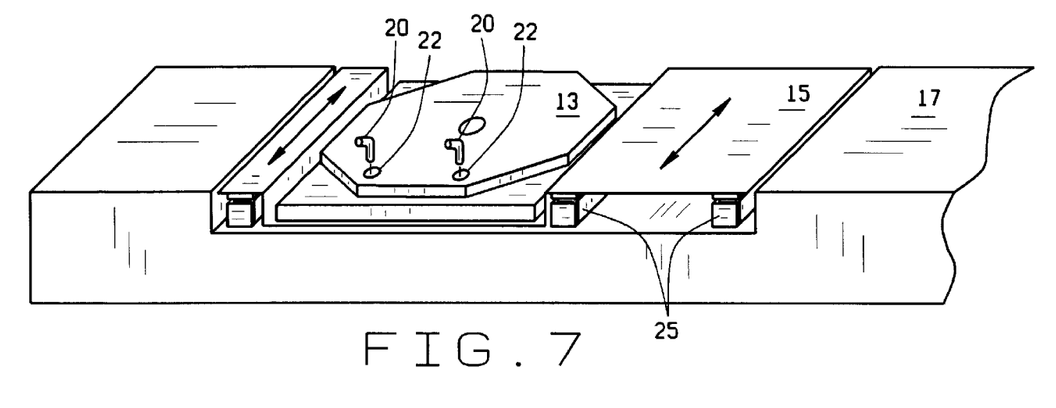
FIG. 7 is a diagram of a front lateral slip plate with an anti-friction turnplate.

Turning to the drawings, FIG. 1 shows apparatus 11 of the present invention in which a conventional turnplate 13 rests on a lateral slip plate 15 (best seen in FIG. 7). The lateral slip plate in turn rests on a lift rack runway 17 defining a path for the vehicle to roll along during run-out compensation. During rolling run-out compensation, the turnplate should not move relative to the lateral slip plate and the lateral slip plate 15 is restricted to lateral movement only with respect to the longitudinal axis of the lift rack 17. To accomplish this, during the run-out measurement procedure the turn plate is pinned to allow the tire 19 to roll continuously along the longitudinal axis of the lift rack. To pin the turn plate 13, a pin 20 is removably received in a hole 22 in the turn plate. The forces applied to the tires are shown as well in FIG. 1, it being understood that the lateral forces shown are relieved by the present invention.

It should be understood that the erroneous measurements otherwise arising from the lateral forces in the present invention are eliminated by providing means to relieve the lateral forces on each wheel 19. Specifically by rolling the vehicle on a device which allows only lateral movement, the lateral forces can be eliminated. This is done by providing one lateral slip plate 15 under one of the front wheels of the vehicle and one lateral slip plate 23 (best shown in FIG. 4) under one of the rear wheels. That is, it is preferred that the apparatus of the present invention include two components, one to relieve the forces in the front suspension and a second to relieve the forces in the rear suspension.

The slip plates may be on the same side or opposite sides of the vehicle. In some cases the lateral forces may be great enough that when the vehicle is rolled onto the lateral slip plate, the travel in the slip plate may be consumed when relieving the initial forces. This can be eliminated by the addition of a lateral slip plate 15a before the slip plate 15 which the run-out measurements are taken.

During the alignment measurements procedure it is necessary to steer the wheels to calculate certain alignment angles. During this subsequent procedure, which takes place after the run-out compensation which is the object of the present invention, the wheels of the vehicle being steered should rest on anti-friction turnplates 13. For the sake of speed, it is desirable, but not necessary, that the final position of the vehicle for the run-out measurement procedure positions the vehicle on the turnplates for the subsequent procedure. This is particularly desirable in a vision alignment system so that the targets are visible to the alignment cameras and in an optimum position for resolution when the wheels are steered. For this purpose it is desirable that the lateral slip plate for the front axle contain a turnplate 13, although it is not an absolute requirement.

Although turnplate 13 is shown in connection with its own slip plate 15, it is possible to design a turnplate which restricts movement to only the lateral direction when a run-out measurement procedure is conducted. Usually in order to measure the run-out it is necessary to roll the vehicle further than the length of a conventional turnplate. Thus, a turnplate which includes the lateral force elimination feature of the present invention must be enlarged compared to conventional turnplates, or one can use a smaller lateral slip plate 15 in conjunction with a turnplate with the option of limiting its motion to a lateral direction.

Another possible solution is to create a lateral slip plate with a turnplate as an integral part such as shown in FIG. 7. This allows for a shallower depth for the turnplate/slip plate assembly.

As can be seen there are numerous ways to obtain the desired result of eliminating the lateral forces acting on the tires and suspension.

The same theory can be applied to the rear slip plates 23. A turnplate is not needed on the rear axle of the vehicle. In conventional rear skid plate on a typical alignment rack, the plates are free to move both laterally and longitudinally. With the addition of a device such as rails 25 (FIGS. 7 and 8) to limit the motion of the skid plates to only lateral motion, the rear skid plate produce the desired effect of eliminating the lateral forces. The length of the rear skid plates are generally long in comparison to a conventional front turnplate. Due to the length, in certain instances the needed lateral travel in the rear skid plate would be too great. To address the problem, the rear skid plate 23 may either be sectioned into several shorter skid plates or several small lateral slip plates may be placed on top of a pinned skid plate 23a–e.

Figure 10:
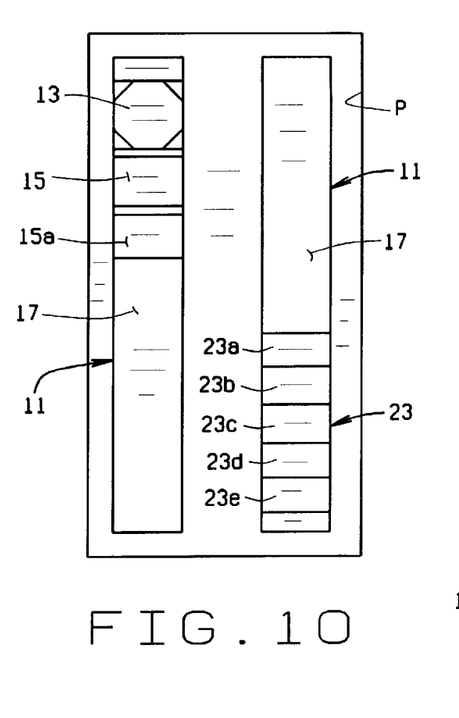
FIG. 10 is a plan view of the apparatus disposed in a pit, the apparatus including a second slip plate in the front of the apparatus and the rear slip plate/skid plate being made of a plurality of smaller slip plates/skid plates.
Figure 11:
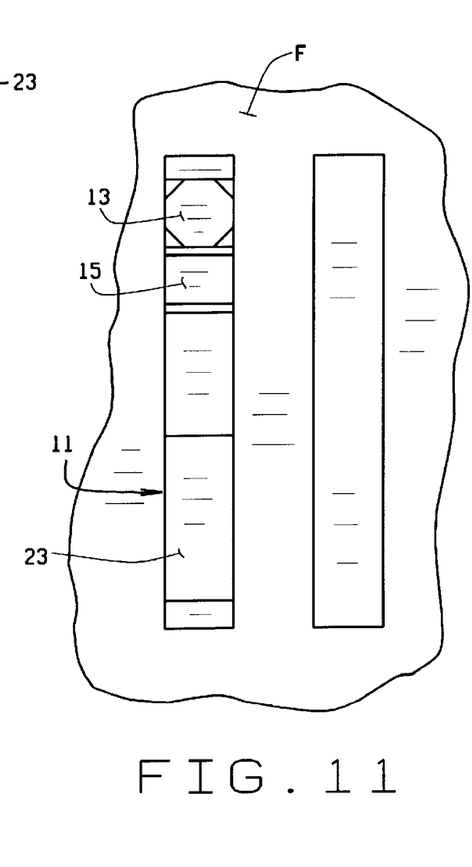
FIG. 11 is a plan view of the apparatus disposed on a floor of an auto shop.

As in the case of the front lateral skid plates as seen in FIG. 10, there are numerous solutions with the same end results of eliminating the lateral forces acting on the tires.

Figure 2A:
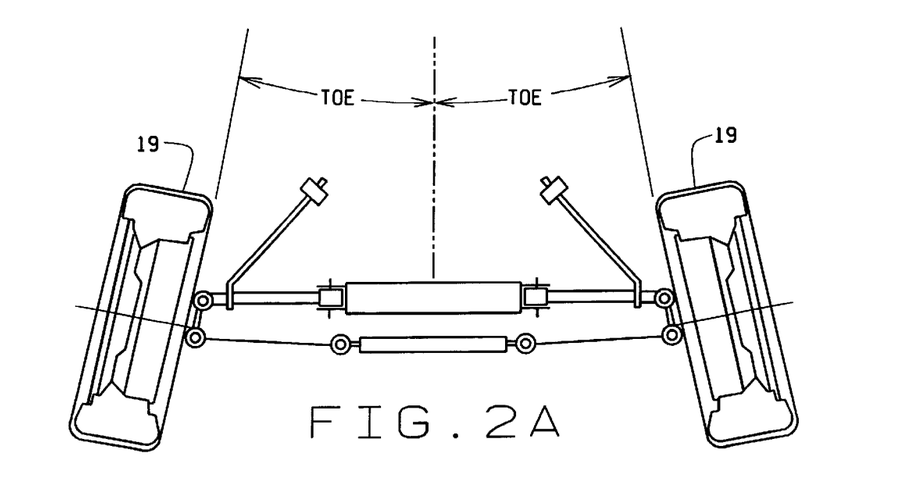
FIG. 2a is a plan view of the front wheels of a vehicle with no lateral forces applied thereto.
Figure 2B:
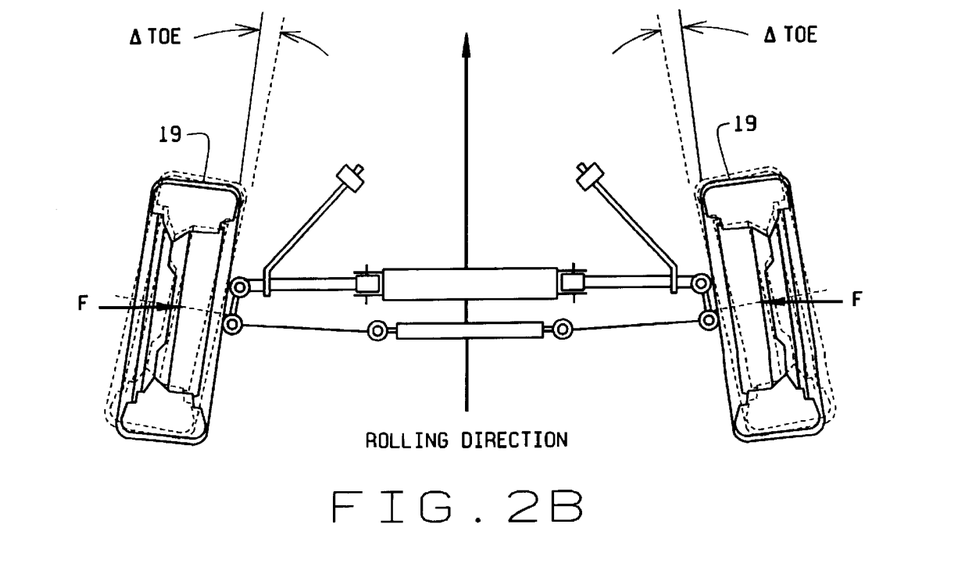
FIG. 2b is a plan view similar to FIG. 2a showing the change in front toe due to applied lateral forces.
Figure 3A:
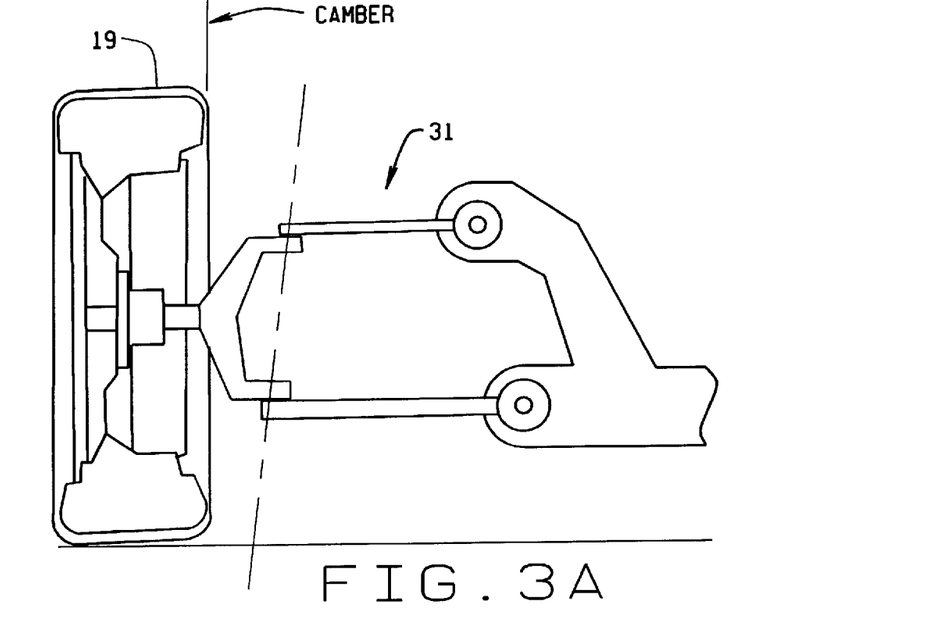
FIG. 3a is a front view of a front suspension of a vehicle with no lateral forces applied thereto.
Figure 3B:
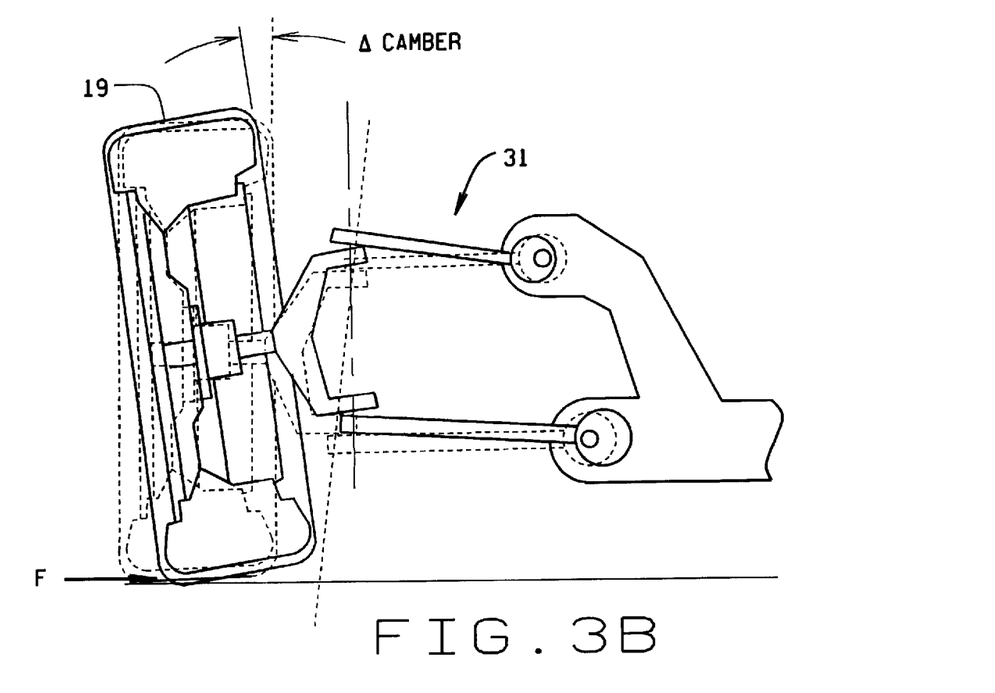
FIG. 3b is a front view similar to FIG. 3a showing the change in camber due to distortion and compliance in the suspension caused by lateral forces.

Turning to FIG. 2a, front wheels 19 of a vehicle are shown with no lateral forces applied thereto. This view should be contrasted with FIG. 2b in which unrelieved lateral force "F" has resulted (compare solid with dashed lines) in a change in toe in the amount of delta-toe. Similarly, a comparison of FIG. 3a with FIG. 3b reveals the change in camber, delta-camber, resulting from distortion and compliance in the suspension 31 caused by lateral forces.

Figure 4A:
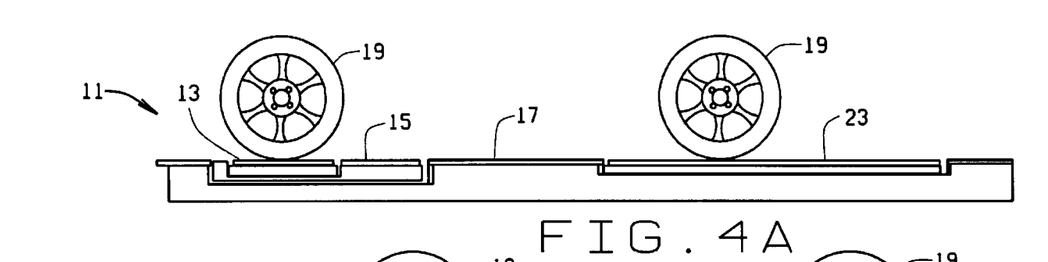
FIGS. 4a–4d are diagrams of a four step procedure of the present invention for rolling run-out measurement.
Figure 4B:
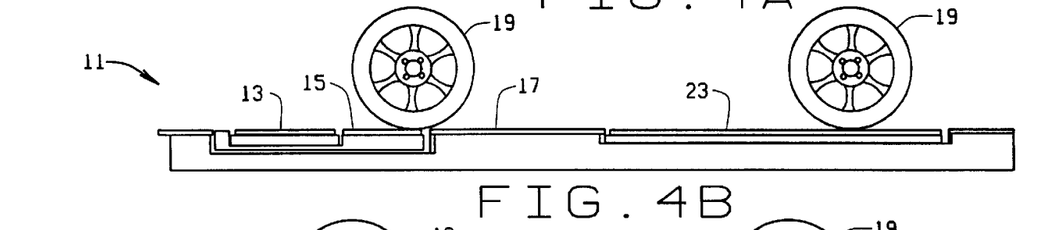
Figure 4C:
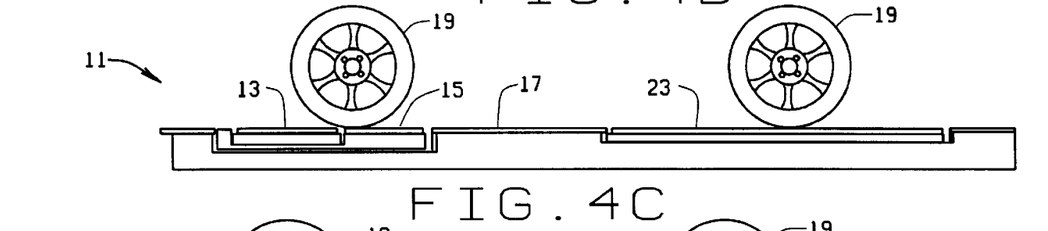
Figure 4D:
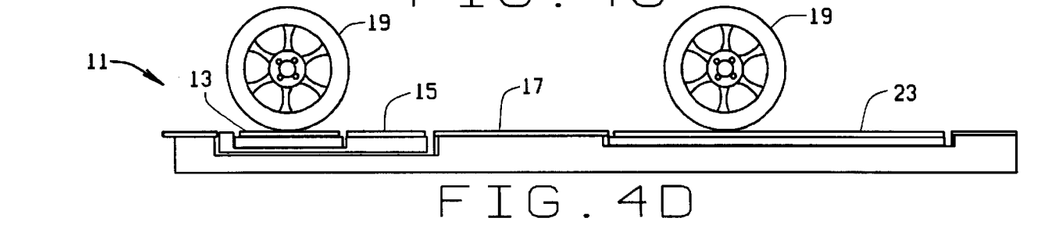

FIGS. 4a–4d illustrate the four step procedure of the present invention for rolling run-out measurement. Note that for all four steps, the wheels 19 (specifically, at least one wheel per axle for a four wheel vehicle) rest on their corresponding slip plates. Thus, the lateral forces otherwise applied to the wheels are relieved for all four positions. In FIG. 4a, the vehicle has been driven forwardly onto the lift rack 17 until the front wheels are on turnplates 13. A run-out measurement is taken at this position. Then the vehicle is moved backwardly until the wheels 19 are positioned as shown in FIG. 4b. No measurement is made at this point; rather, at this point the vehicle is rolled forward to the second position (discussed immediately below), thereby relieving any hysteresis. Then the vehicle is moved forwardly to the intermediate position shown in FIG. 4c and a second run-out measurement is taken. Finally, the vehicle is moved forwardly to its final position (FIG. 4d) which is substantially the same as the first position, and a final run-out measurement is taken.

Figure 5A:
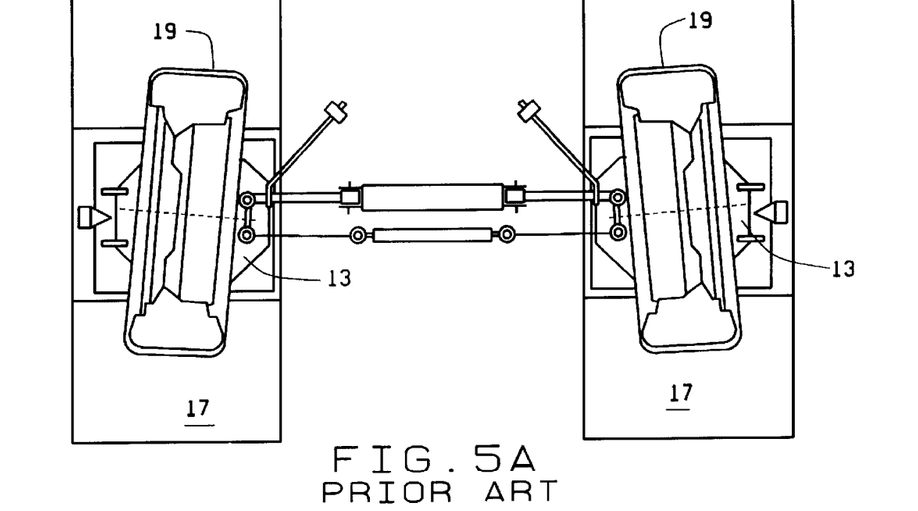
FIGS. 5a–5c are plan views illustrating the distortion in total toe during a rolling run-out measurement when lateral forces are present.
Figure 5B:
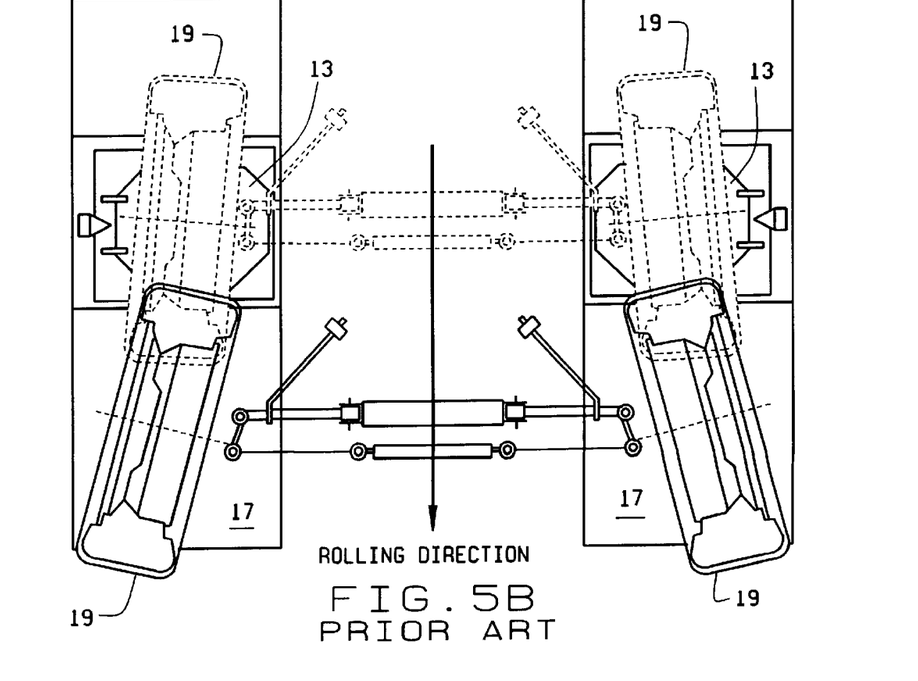
Figure 5C:
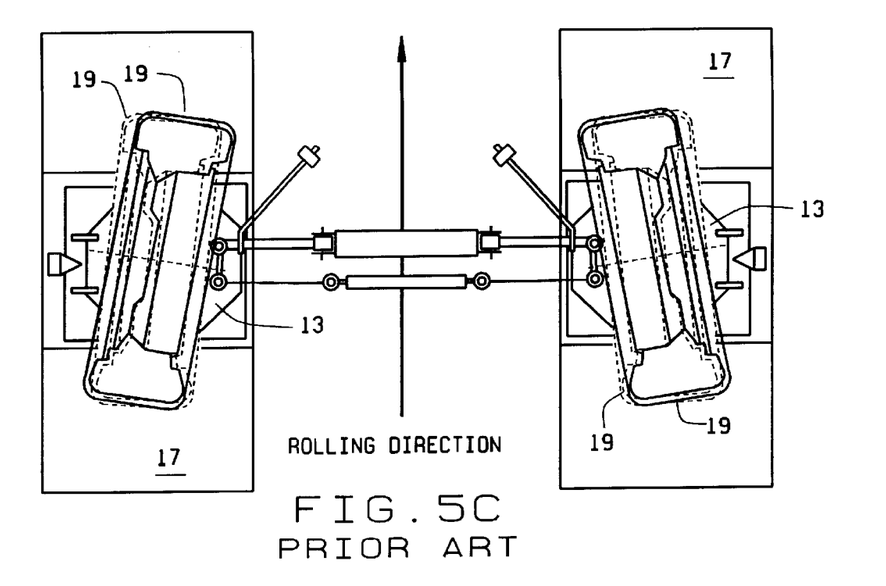

Note that the present invention involves backing the vehicle before one of the measurements. As noted above, this creates significant errors in prior art machines. FIGS. 5a–5c illustrate the distortion in total toe during a rolling run-out measurement when lateral forces are present.

Specifically, the significant change in toe illustrated in FIG. 5b is the natural result of backing a vehicle along the lift rack with conventional apparatus. As illustrated in FIG. 5c, even when the vehicle is moved forwardly back to the turnplate, the toe at this time (the tire position is shown in solid lines) differs from the initial angle (indicated by the dashed lines).

Figure 6A:
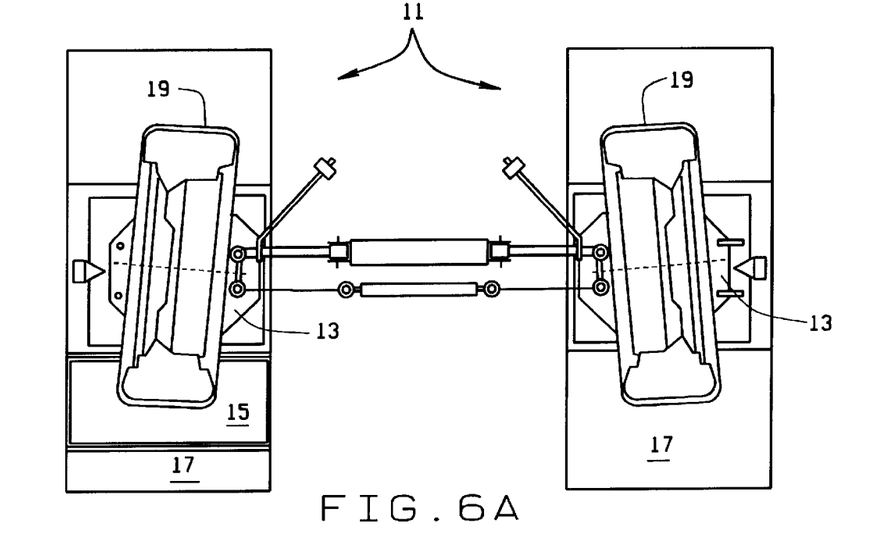
FIGS. 6a–6c are plan views of the front suspension during a rolling run-out measurement with lateral slip plates of the present invention in place.
Figure 6B:
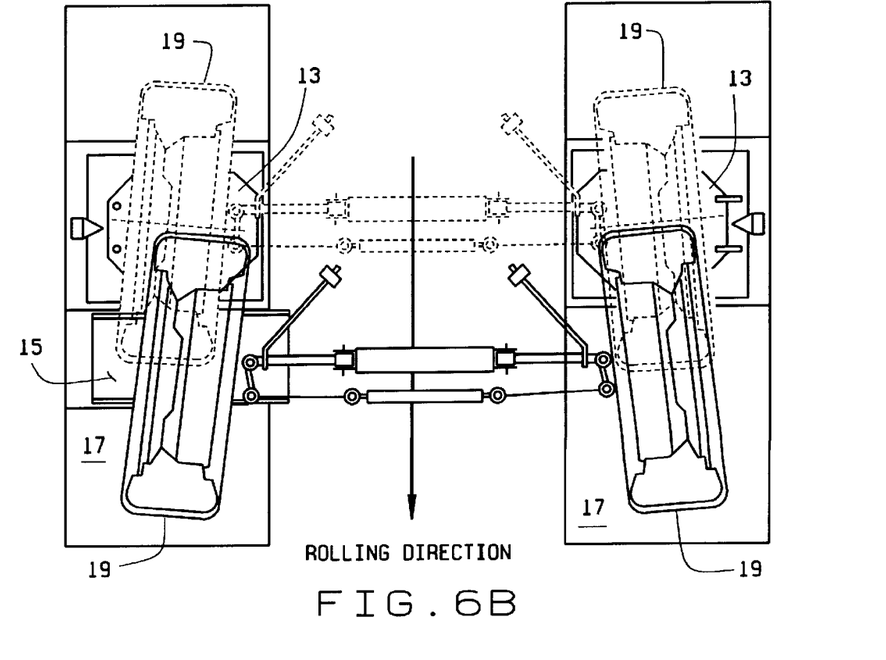
Figure 6C:
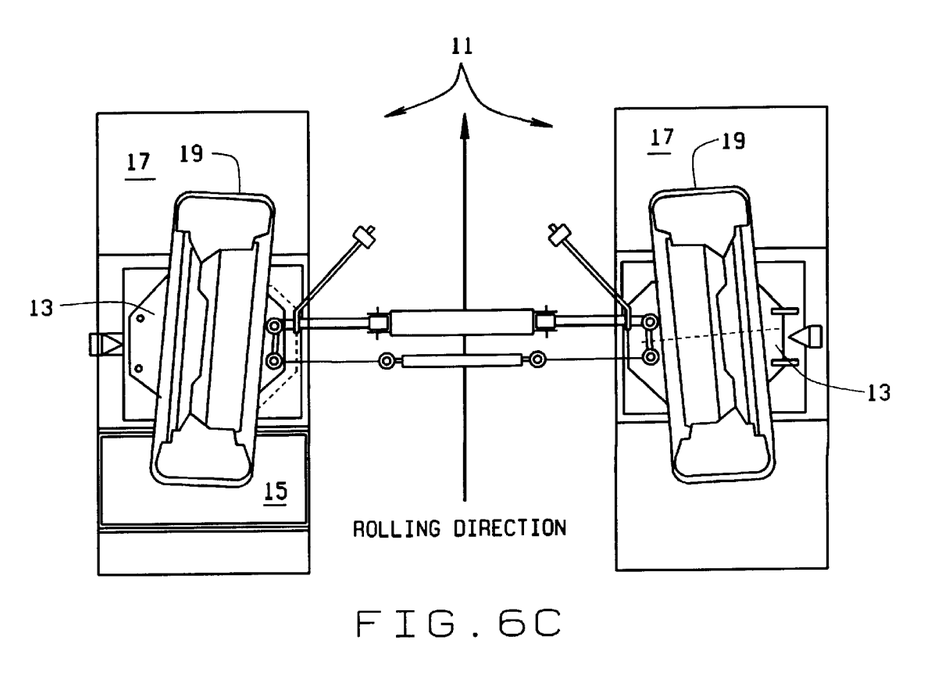

Both of these errors are eliminated with the present invention, as illustrated by FIGS. 6a–6c. Note particularly in FIG. 6b the translational movement of slip plate 15.

Figure 8:
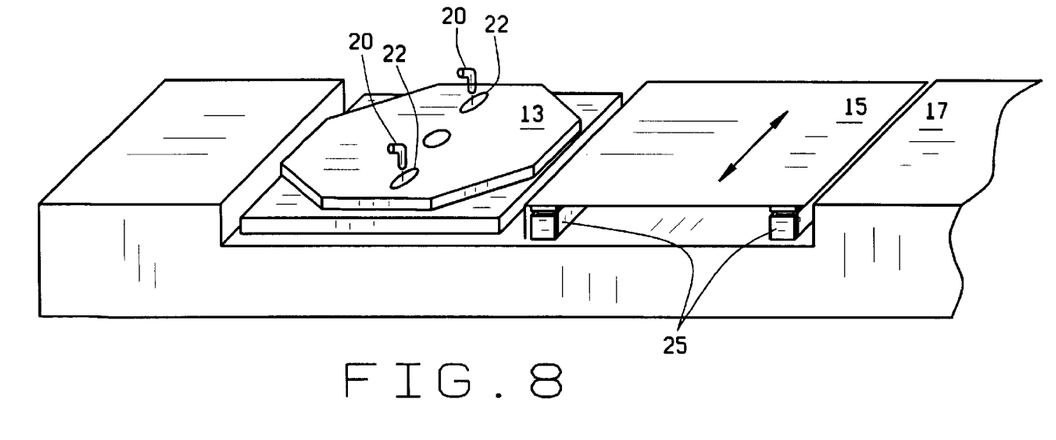
FIG. 8 is a diagram of a front lateral slip plate with an anti-friction turnplate positioned in front of it.

As discussed above, FIG. 7 shows a front lateral slip plate 15 with an anti-friction turnplate 13 while FIG. 8 shows a separate turnplate 13 with a slip plate 15 positioned in front of it. Such structures may be readily incorporated into lift racks 17 positioned in a Pit P, or positioned on or in an auto shop floor F. Alternatively, lift racks can be retrofitted with the lateral force relieving slip plates of the present invention.

Figure 9A:
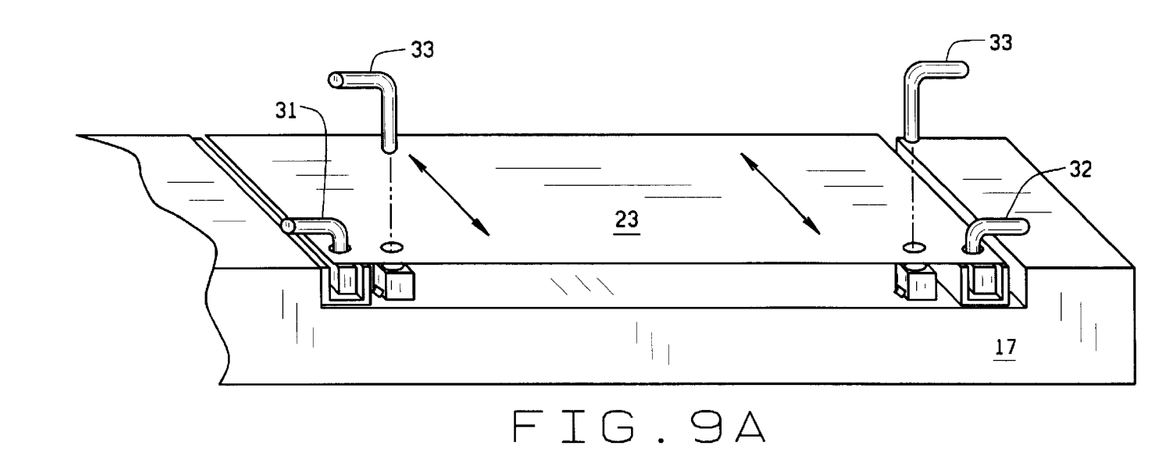
FIGS. 9a and 9b are diagram of a rear lateral slip plate assembly of the present invention.
Figure 9B:
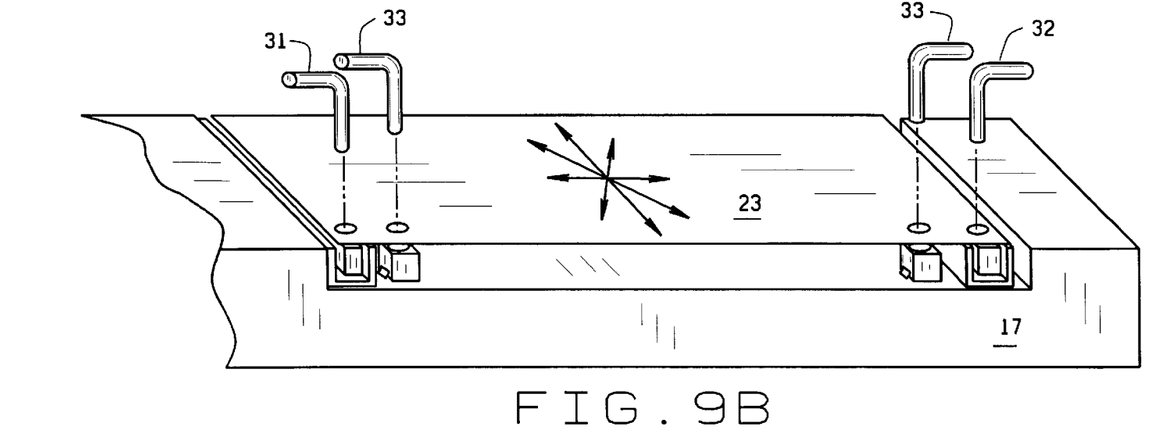

FIGS. 9a and 9b illustrates a rear lateral slip plate assembly 23 of the present invention. Note particularly that in FIG. 9a the plate is pinned by pins 32 against longitudinal movement. (Pins 33 are also provided to prevent lateral movement as well if desired.) In FIG. 9b, pins 32 and 33 are all removed, which allows plate 23 to move both longitudinally and laterally. It should be noted, however, that in the normal mode of operation of the present invention pins 31 are in place and pins 33 are removed so that the plate 23 is restricted to lateral movement only.

In view of the above, it will be seen that the various objects and features of the present invention are achieved and other advantageous results obtained. The drawings herein and accompanying description are illustrative only, and are not to be taken in a limiting sense.

What is claimed is:

1. An Apparatus for eliminating run-out errors in the determination of vehicle alignment comprising:
   a first station at which run-out measurements of wheels of a first axle of a vehicle are made; said first station including a slip plate assembly having at least one slip plate, the at least one slip plate having an upper surface and a turn plate having an upper surface; said slip plate upper surface and turn plate upper surface being spaced apart along a path of travel such that at least one of said first axle wheels rolls over and contacts said slip plate and turn plate upper surfaces; said first station slip plate assembly being movable laterally when lateral forces are applied to the wheels of the first axle; said turn plate being selectively switchable between a first mode in which the turn plate is restricted to lateral movement only when lateral forces are applied to the wheels of the first axle and a second mode in which the turn plate is movable in all directions relative to the first station slip plate assembly;
   a second station, disposed longitudinally of the first station, at which run-out measurements of wheels of a second axle of the vehicle are made, said second station including a slip plate assembly comprising at least one slip plate; said second station slip plate assembly being movable laterally when lateral forces are applied to the wheels of the second axle;
   said first station slip plate assembly and said second station slip plate assembly substantially eliminating lateral forces acting on said wheels prior to the measurement of run-out, said first and second station slip plate assemblies being fixed against longitudinal movement so as to allow the wheels of the vehicle to roll with respect to said slip plate assemblies.

2. The apparatus as set forth in claim 1 wherein said first station slip plate assembly includes a single slip plate, said single slip plate extending longitudinally along the path a distance selected to allow all the run-out measurements to be taken while one of the wheels of the first axle is rolled over the first station slip plate assembly.

3. The apparatus as set forth in claim 1 wherein the first station slip plate assembly and the second station slip plate assembly are disposed on the same side of the path of travel.

4. The apparatus as set forth in claim 1 wherein the first station slip plate assembly and the second station slip plate assembly are disposed on opposite sides of the path of travel.

5. The apparatus as set forth in claim 1 further including a third slip plate disposed along the path so as to relieve lateral forces before the wheels are rolled onto the first station slip plate.

6. The apparatus as set forth in claim 1 wherein the turn plate is integrally connected to the first station slip plate assembly.

7. The apparatus as set forth in claim 1 wherein the path of travel is along a lift rack.

8. The apparatus as set forth in claim 1 wherein the first and second stations are disposed on a floor.

9. The apparatus as set forth in claim 1 wherein the first and second stations are disposed in a pit.

10. The apparatus as set forth in claim 1 wherein the first and second stations are disposed in a floor.

11. The apparatus as set forth in claim 1 wherein the second station slip plate assembly comprises a single slip plate, said slip plate extending longitudinally along the path a distance selected to allow all the run-out measurements to be taken while one of the wheels of the second axle is rolled over said second station slip plate assembly.

12. The apparatus as set forth in claim 1 wherein said second station slip plate assembly comprises a plurality of slip plates disposed longitudinally with respect to each other.

13. A method of eliminating errors in wheel alignment measurements comprising the steps of:
   rolling a vehicle in a first direction to a first position along a path to be traveled by the vehicle;
   substantially relieving all lateral forces applied to the wheels of the vehicle at said first position;
   making a first set of wheel alignment measurements while the vehicle is disposed at the first position;
   rolling the vehicle in a second direction opposite to said first direction from the first position to a second position along said path, said second position being spaced from said first position;

rolling the vehicle in the first direction from the second position to a third position to substantially eliminate any hysteresis in wheel alignment measurements prior to making another wheel alignment measurement;

substantially relieving all lateral forces applied to the wheels of the vehicle at said third position;

making a second set of wheel alignment measurements at said third position;

rolling the vehicle to a fourth position;

substantially relieving all lateral forces applied to the wheels of the vehicle at said fourth position; and making a third set of wheel alignment measurements at said fourth position.

14. The method as set forth in claim 13 wherein the third position is intermediate the first and second positions along the path.

15. The method as set forth in claim 13 wherein the third position is disposed rearwardly of the first position along the path of travel.

16. The method as set forth in claim 15 wherein the vehicle is rolled forwardly along the path of travel from the second position to the third position.

17. The method as set forth in claim 16 wherein the vehicle is rolled forwardly along the path of travel from the third position to the fourth position.

18. The method as set forth in claim 13 wherein all lateral forces are substantially relieved by passing at least one wheel of each axle over slip plates which are confined to move only laterally.

19. The method as set forth in claim 13 wherein the wheel alignment measurements include run-out measurements.

20. A method of eliminating errors in wheel alignment measurements comprising the steps of:

positioning a vehicle at a first position along a path to be traveled by the vehicle;

substantially relieving all lateral forces applied to the wheels of the vehicle at said first position;

making a first set of wheel alignment measurements while the vehicle is disposed at the first position;

rolling the vehicle rearwardly from the first position to a second position along said path, said second position being spaced from said first position;

rolling the vehicle forwardly from the second position to a third position;

substantially relieving all lateral forces applied to the wheels of the vehicle at said third position;

making a second set of wheel alignment measurements at said third position;

rolling the vehicle to a fourth position; the fourth position being substantially the same as the first position substantially relieving all lateral forces applied to the wheels of the vehicle at said fourth position; and making a third set of wheel alignment measurements at said fourth position.

21. An apparatus for eliminating vehicle alignment measurement errors comprising:

a station at which alignment measurements of wheels of an axle of a vehicle are made; said station including a slip plate having an upper surface and a turn plate having an upper surface; said slip plate upper surface and turn plate upper surface being spaced apart along a path of travel such that at least one of said wheels rolls over and contacts said slip plate and turn plate upper surfaces; said turn plate being selectively switchable between a first mode in which the turn plate is restricted to lateral movement only when lateral forces are applied to the wheels of the axle and a second mode in which the turn plate is movable in all directions relative to the station slip plate;

said slip plate substantially eliminating lateral forces acting on said wheels during measurement of run-out, said station slip plate being fixed against longitudinal movement so as to allow the wheels of the vehicle to roll with respect to said slip plate.

22. The apparatus as set forth in claim 21 wherein the station extends longitudinally a predetermined distance to allow measurements to be taken at two longitudinally spaced positions, with lateral forces on said wheels being substantially eliminated at both longitudinally spaced positions.

* * * * *